United States Patent [19]

Ahn

[11] Patent Number: 4,621,686
[45] Date of Patent: Nov. 11, 1986

[54] WATER VAPOR-CONDENSING SECONDARY HEAT EXCHANGER

[75] Inventor: Hongsik Ahn, Chesterfield, Mo.
[73] Assignee: Intertherm, Inc., St. Louis, Mo.
[21] Appl. No.: 655,448
[22] Filed: Sep. 28, 1984

Related U.S. Application Data

[63] Continuation-in-part of Ser. No. 568,382, Jan. 5, 1984, Pat. No. 4,478,206.

[51] Int. Cl.⁴ .............................................. F28B 9/08
[52] U.S. Cl. ...................................... 165/113; 165/111; 165/921
[58] Field of Search ........................ 165/111, 113, 921

[56] References Cited

U.S. PATENT DOCUMENTS

| | | | |
|---|---|---|---|
| 774,992 | 11/1904 | Otis | 165/111 |
| 1,219,535 | 3/1917 | Carroll | 165/111 |
| 3,262,489 | 7/1966 | Fritzberg | 165/113 X |
| 3,675,710 | 7/1972 | Ristow | 165/176 X |
| 4,141,410 | 2/1979 | Takada | 165/113 |
| 4,202,405 | 5/1980 | Berg | 165/111 |
| 4,241,874 | 12/1980 | Schossow | 126/117 X |

FOREIGN PATENT DOCUMENTS

| | | | |
|---|---|---|---|
| 473133 | 3/1929 | Fed. Rep. of Germany | 165/111 |
| 3269 | of 1911 | United Kingdom | 165/111 |

Primary Examiner—Albert W. Davis, Jr.
Assistant Examiner—Peggy A. Neils
Attorney, Agent, or Firm—Jerome A. Gross

[57] ABSTRACT

A compact secondary heat exchanger, installed in the path of room air through the casing of a gas furnace, utilizes a unitary condensing coil having parallel upper, middle and lower sets of tubes through which the flue gas passes sequentially to a collector manifold, exhausted by a blower. The coil is slanted downwardly from the hot gas manifold. Condensate formed in the first and second sets of tubes flows downward to an intermediate manifold between the first and second sets of tubing, condensate from this intermediate manifold is drained downward to a collector manifold beneath.

3 Claims, 2 Drawing Figures

WATER VAPOR-CONDENSING SECONDARY HEAT EXCHANGER

CROSS-REFERENCE TO RELATED APPLICATIONS

This application is a continuation-in-part of U.S. patent application Ser. No. 06/568,382; filed Jan. 5, 1984, now U.S. Pat. No. 4,478,206, issued Oct. 23, 1984.

TECHNICAL FIELD

A secondary heat exchanger, comprising a finned coil incorporating three sets of tubes through which combustion gases pass sequentially, recovers much of the latent heat of water vapor in combustion gases.

BACKGROUND ART

Combustion gases of hydrocarbon fuels include roughly 10% water vapor whose latent heat may be substantially recovered when the water vapor is condensed in a secondary heat exchanger. In my said co-pending application, a highly efficient secondary heat exchanger is disclosed, to fit within the air casing of a furnace of the type which provides a substantially vertical path, for room air to which the heat is to be exchanged, between an air blower and a primary heat exchanger. It uses a blower to augment the flow, through a heat exchange coil, of the cooled combustion gases, which afford little draft and whose flow might be further impeded by condensate forming in the three sequential runs of tubing. The second and third runs are inclined downward, requiring them to be separately finned.

DISCLOSURE OF THE INVENTION

A principal purpose of the present invention is to provide a secondary heat exchanger which is even more space saving than the one disclosed in my said co-pending application, and more simply manufactured. A further purpose is to make new provision for lessening interference between the draining of condensate and the passing of combustion gases through the heat exchanger.

In the present invention I utilize three sequential runs of tubing which are positioned parallel to each other and incorporated in a single finned coil, installed tilted slightly downward from a hot gas manifold. An intermediate manifold is provided between the first and second tubing runs, immediately above the collector manifold; in the preferred embodiment these are upper and lower chambers of the same elongated box-like member.

The ends of the first and second sets of tubes, opposite the hot gas manifold, are sealed in the side wall of the upper chamber, which forms the intermediate manifold. The upper ends of the second set of tubes connect, adjacent to the hot gas manifold, to upper ends of the third run of tubing whose lower ends penetrate the side wall of and lead into the lower chamber which constitutes the collector manifold. As with the embodiment of my co-pending application, the collector manifold has a condensate drain and also a flue gas exhaust drawn by a blower.

Combustion gases, preliminarily cooled by a flow over the surface of a conventional primary heat exchanger, are conducted through the hot gas manifold to and through the first, second and third sets of tubing, their temperature being progressively lowered as the heat is extracted. The exhaust temperature has proved to be between 115° F. to 120° F.

Such cooling results in condensation of the greater part of the water vapor in the hydrocarbon combustion gases. At start up, when the secondary heat exchanger is quite cool, there will be condensation even in the first run of tubes; after stable operating temperature has been reached, condensation will occur principally in the second and third sets of tubes. The problem presented is how to keep the condensate from interfering with the flow of combustion gases, which are so cooled as to afford little natural draft. In my co-pending application, this is accomplished by having the condensate, in the second and third runs of tubing, flow in the same direction as the flow of gas therethrough, augmented by the blower.

In contrast, in the present invention, combustion gas flows sequentially through three runs of tubing, mounted parallel to each other in a single condensing coil; but the condensate formed in the second set of tubes drains in a direction opposite to the flow of the gas; that is, downward to the same intermediate manifold from which it receives its flow of combustion gas from the first set of tubes. Condensate from the second set of tubes (and any condensate which may have been formed in the first set of tubes) is drained away without flowing through the third set of tubes; thus the tendency of condensate to clog this set of tubes is therefore reduced.

To drain the condensate from the intermediate manifold above to the collector manifold beneath, gave rise to the problem how to assure that the combustion gases would not bypass the second and third sets of tubes. This problem was solved by designing the drain apertures, in the partition which divides the upper and lower chambers, to be sufficiently small that the condensate draining largely from the second set of tubes would provide a protective water film across these apertures.

THE DRAWINGS

The portions shown in phantom lines are as utilized in my co-pending application.

BEST MODE FOR CARRYING OUT THE INVENTION

Figure 1:
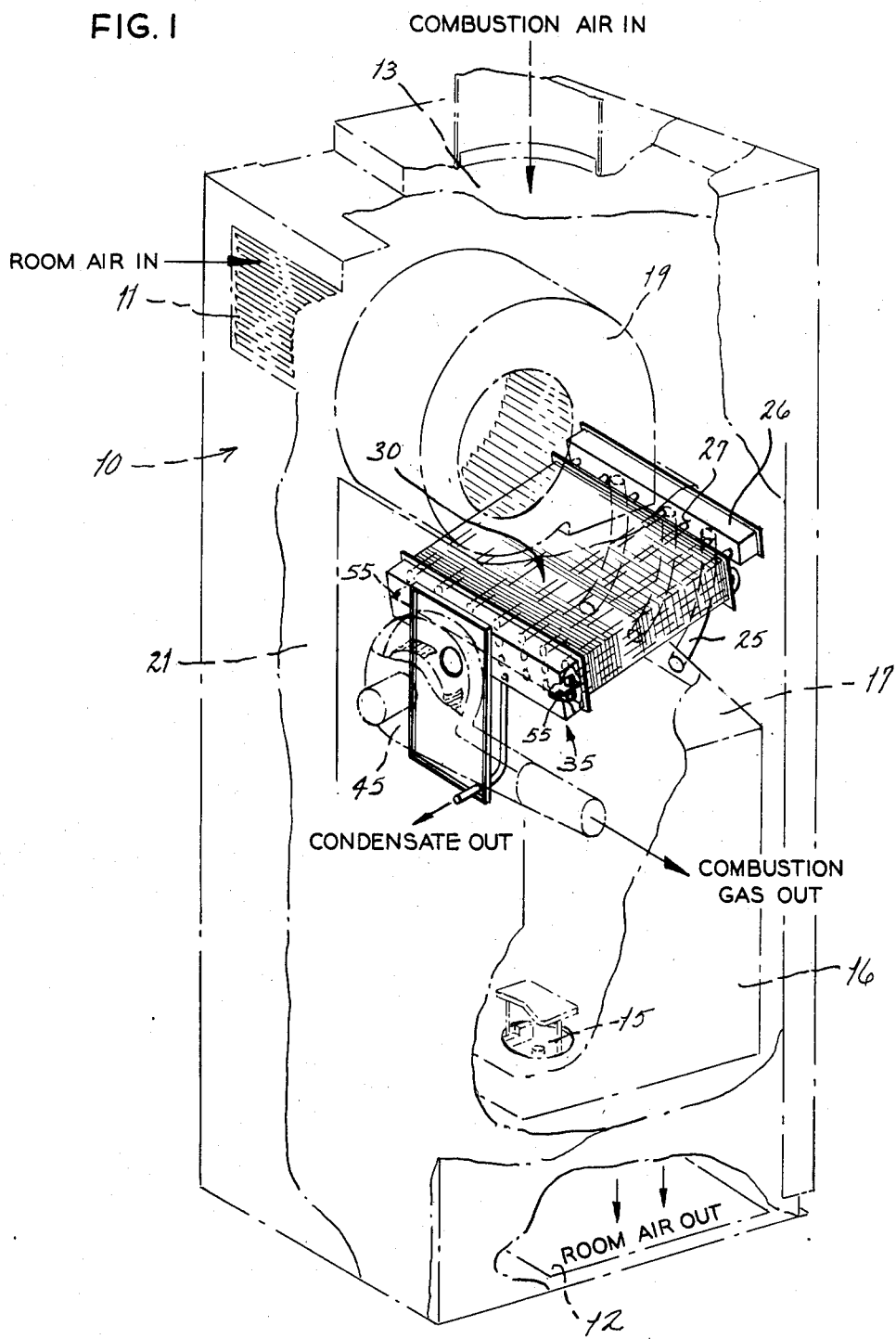
FIG. 1 is a view of a furnace having a vapor-condensing secondary heat exchanger embodying the present invention.

The preferred type of furnace utilizing my new secondary heat exchanger is shown in FIG. 1. It includes a furnace cabinet 10 having an inlet grill 11 for room air, a bottom room air outlet 12, a top combustion air inlet 13 leading to a gas burner 15 within the hollow chamber of the primary heat exchanger 16, which has sloping upward walls 17 presented in the vertical path of room air leading downward from a room air blower 19. Further details of construction of such a furnace are as shown in my said co-pending application, which is herein incorporated by reference.

Figure 2:
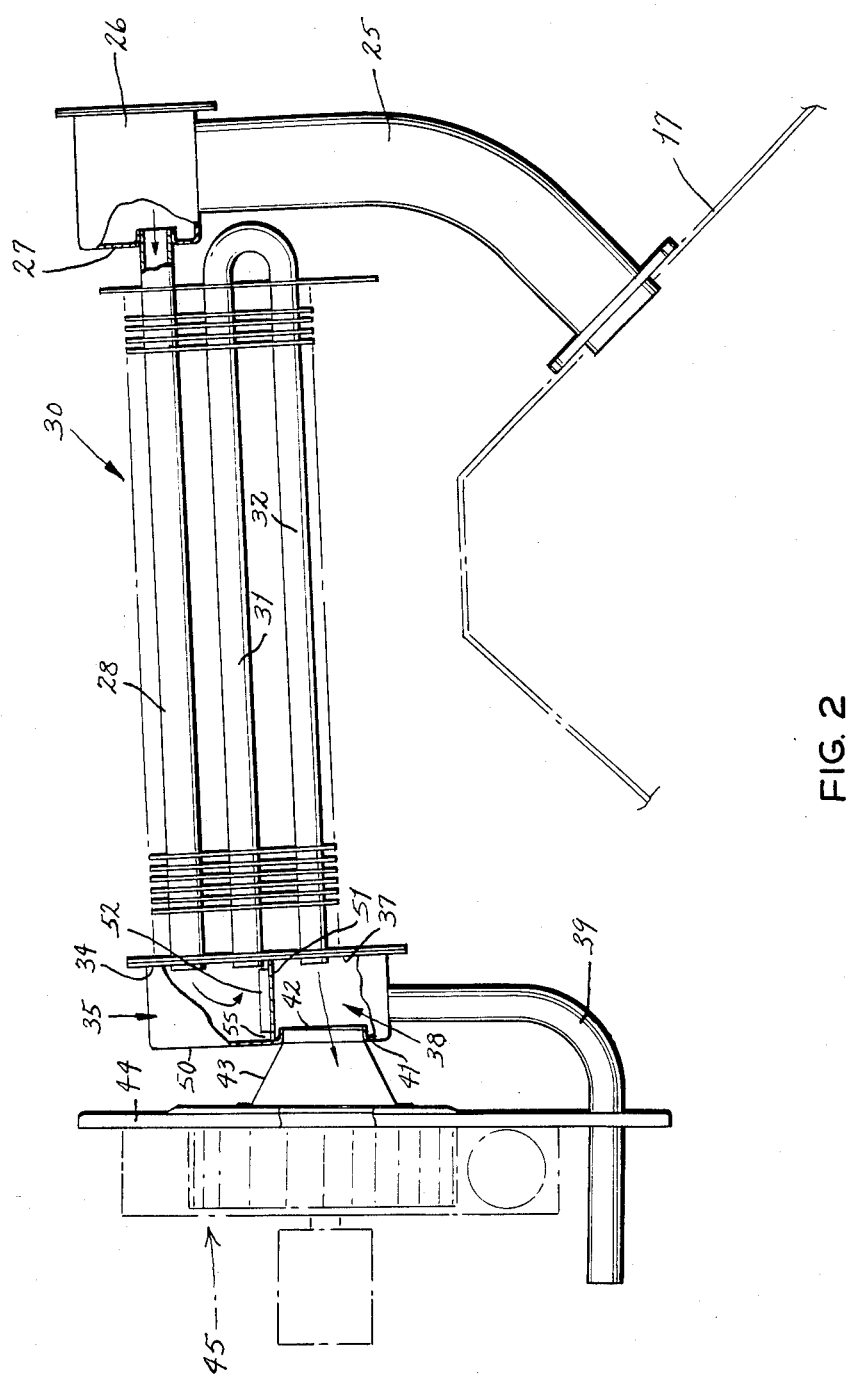
FIG. 2 is an elevational view of the secondary heat exchanger shown in FIG. 1.

The present secondary heat exchanger receives combustion gas from the interior of the primary heat exchanger 16. As seen in FIG. 2, installed in the sloping upper walls of the primary heat exchanger 16 are a plurality of (for example, three) combustion gas tubes 25 which lead upward along the aft side of the vertical air path from the blower 19, which path extends downward within the air casing of the furnace cabinet 10; the combustion gas tubes 25 lead into a hot gas manifold 26 which is here in the form of a horizontally elongated box. In its forward-facing wall 27 are sealedly installed the inlet ends of a first or upper set 28 of three sets of heat exchanger tubes, contained in the finned coil generally designated 30, so installed as to slope slightly downward from the hot gas manifold 26. As shown in FIG. 2, the first tube set 28 consists of parallel tubes at an upper level in the coil 30, the second tube set 31 is at an intermediate level, whereas the third tube set 32 is at the lowermost level, all of said tubes extending parallel to each other. As is conventional, the tubes in the first, second and third sets 28, 31 and 32 are staggered vertically from each other for better cooling by downflow of air from the blower 19.

The lower or outlet ends of the first tube set 28 are sealedly mounted within the side wall 34 of an intermediate manifold generally designated 35. Within the same manifold at a lower level are sealedly mounted the inlet ends of the second set of tubes 31, which rise slightly to outlet ends which have reversing 180° bends, to continuously form the downward-sloping third tube set 32. The outlet ends of the third tube set 32 are sealed within the side wall 37 of a collector manifold generally designated 38, whose lower wall has a condensate drain 39. Opposite to the collector manifold side wall 37 is an outlet wall 41 having a circular cool gas exhaust port 42, which mounts a short duct 43 leading to a central opening in a mounting plate 44. This opening leads into a suction exhaust blower 45, mounted on the plate 44.

The preferred construction of the intermediate manifold 35 and the collector manifold 38 will now be described. Both are incorporated in a single elongated box-like member 50; this is divided into an upper chamber 48 (which serves as the intermediate manifold 35) and a lower chamber 49 (which serves as the collector manifold 38) by an intermediate wall 51. The wall 51 is preferably formed of sheet metal attached, at least in part, by flanges 52 to the side walls of the box-like member 50, as shown. The intermediate wall 51 has the same downward slope as the entire finned coil 30. At its corners along its lowermost edge shown to the left in FIG. 2, it has two small drain apertures 55, to permit the drain of condensate from the intermediate manifold 35 to the collector manifold 38. The size of these apertures is determined empirically to meet operating requirements as hereafter described.

In the use of such a heat exchanger, in which the flue gas passes sequentially through a first, second and third set of tubes crossing the vertical path of room air through a furnace, and in which the temperature of the flue gas is reduced from over 400° F. to approximately 120° F. or less, a severe problem is encountered: how to make up for the loss of natural draft, as well as to avoid clogging of the sets of tubing 28, 31 and 32 by the condensate. In the embodiment of invention shown in my co-pending application, this was done by utilizing two separate finned coils, the first of which provided sequential flow through an upper and a lower set of tubing. This first coil slanted upward from the hot gas manifold; whatever small amount of condensate was formed in the first set of tubes would be returned to the hot gas manifold 26, while condensate formed in the second set of tubes would flow downward to the third set of tubes in its separately finned coil, which, in turn sloped downward to the suction-assigned collector manifold.

In the present embodiment a different principle is utilized. Whatever condensate forms in the first set of tubes 28 drains downward into the intermediate manifold 35 as the flue gas passes from the outlet ends of the first tube set 28 to the inlet ends of the second tube set 31. The very substantial amount of condensate which forms in the second tube set 31 does not flow in the same up-sloping direction as the flue gas; to the contrary, it flows back downward into the intermediate manifold 35. The flue gas flow proceeds reversingly into the third tube set 32 and thence to the collector manifold 38, in the same direction as the drainage of its newly-forming condensate. Thus the intermediate manifold 35 relieves the third tube set 32 of the burden of carrying previously formed condensate.

This construction presents the problem how to drain condensate from the intermediate manifold 35. A drain through the wall 51 would seemingly allow flue gas to by-pass the second and third tube sets 31, 32.

This is avoided, in the present invention, by maintaining the size of drain apertures substantially at a minimum required for operating the system. In the present embodiment only two drain apertures 55 are provided, at the outer lower corners of the intermediate wall 51. They are sized to permit adequate downflow from the intermediate manifold 35 to the collector manifold 38 and yet small enough to be filmed over by condensate which forms on start-up when hot combustion gas contacts the coil 30. As the apertures 55 film over with water, they avoid any diverting of the flue gas to by-pass the second and third tube sets 31, 32.

Since the third tube set 32 is not burdened with condensate from the second tube set 31, outflow is more readily induced by the blower 45. The principal advantage, however, over the embodiment shown on my co-pending application, is the lesser space occupied within the air path of the furnace 10 and the simplicity and straightforwardness of construction.

From this specification, variations in construction and mode of usage will occur to those skilled in the art.

The embodiments of the invention in which an exclusive property or privilege is claimed are defined as follows:

1. For use in a furnace of the type which burns fuel yielding water vapor as a product of combustion, and including a casing having a substantially vertical path portion for air to which heat is to be exchanged, a water vapor-condensing heat exchanger comprising a hot combustion gas manifold extending substantially horizontally along one side of such vertical path portion, an intermediate manifold extending substantially parallel thereto along the opposite side of such vertical path portion at a lower elevation, a collector manifold extending substantially parallel to and directly underneath said intermediate manifold, a single heat exchange coil made up of a first set of heat exchange tubes having inlet ends connected to the hot gas manifold and extending at a downward slope therefrom across such vertical path portion to outlet ends within said intermediate manifold, a second set of heat exchange tubes extending from inlet ends within said intermediate manifold, reversingly across such vertical path portion and at an upward slope parallel to said first set of tubes, to outlet ends, to which are connected the inlet ends of a third set of heat exchange tubes which extend reversingly across such vertical path portion sloping downward and somewhat below and parallel to said second set, to lowermost outlet ends within said collector manifold, said coil having a set of heat exchange fins common to said first, second and third sets of tubes, means at said collector manifold to apply suction to said lowermost outlet ends of said third set of tubes, and means to drain condensate from combustion interruptedly from both said collector manifold and said intermediate manifold.

2. A water vapor-condensing heat exchanger as defined in claim 1, wherein said means to apply suction to the collector manifold comprises a suction blower.

3. A water vaporcondensing heat exchanger as defined in claim 1, wherein said intermediate manifold and said collector manifold together comprise the upper and lower chambers, respectively of an elongated box-like member, having a side wall which, at said upper chamber, is penetrated by and is sealed about the lowermost ends of said first and second sets of tubes, and which at said lower chamber is penetrated by and sealed about the lower ends of said third set of tubes, and wherein the means to drain condensate from said intermediate manifold comprises a gravity aperture drain through said intermediate wall into said lower chamber, said aperture drain being sufficiently small as to become filmed over when condensate is present in said upper chamber.

* * * * *

UNITED STATES PATENT AND TRADEMARK OFFICE
CERTIFICATE OF CORRECTION

PATENT NO. : 4,621,686

DATED : November 11, 1986

INVENTOR(S) : Ahn, Hongsik

It is certified that error appears in the above-identified patent and that said Letters Patent is hereby corrected as shown below:

In column 4, line 1, change "assigned" to ---assisted---;

column 5, line 7, after "combustion" add ---gas---.

Signed and Sealed this

Twenty-fourth Day of February, 1987

Attest:

DONALD J. QUIGG

Attesting Officer    Commissioner of Patents and Trademarks